Nov. 6, 1962 H. M. BOLZ 3,062,088

NULL-TYPE RADIATION ANALYSIS SYSTEM

Filed April 9, 1959

INVENTOR.
H.M. BOLZ
BY

3,062,088
NULL-TYPE RADIATION ANALYSIS SYSTEM

Hans Martin Bolz, Überlingen (Bodensee), Germany, assignor to Bodenseewerk, Perkin-Elmer & Co., G.m.b.H., Überlingen (Bodensee), Germany
Filed Apr. 9, 1959, Ser. No. 805,279
9 Claims. (Cl. 88—14)

This invention relates to a null-type radiation analysis system. In such an arrangement the beam of radiation used for measurement is compared with a nulling beam of radiation by arranging in the ray path of the nulling beam an attenuator which is adjusted as a function of the difference in intensities of the measuring beam and the nulling beam. The degree of adjustment of the attenuator serves as a measure of the variations in intensity of the beam of radiation used for measurement. In particular, the invention relates to apparatus for the analysis of absorption spectra. With well known apparatus of this kind, two beams of radiation emitted from a single radiant source are directed into a spectroscope and to a radiation sensitive detector arranged behind the exit slit of the spectroscope. The detector may be a photoelectric cell or, in particular with infrared radiation, a thermocouple. One of the beams of radiation, the beam used for measurement, passes through a sample of interest, while the other beam, the nulling beam of radiation, passes through air or vacuum. A revolving trimmer and mirror disk has the effect of directing alternatingly the measuring beam and the nulling beam to the spectroscope and the radiation sensitive detector.

The radiation sensitive detector will supply an alternating current as long as the two beams of radiation have different intensities. This alternating current serves to control a servomotor which adjusts an attenuator disposed in the ray path of the nulling beam until the attenuation of the nulling beam effected by the attenuator corresponds to the attenuation of the measuring beam which is due to the absorption of the wavelength analyzed in the sample. The adjustment of the attenuator serves as a measure of the absorption. By adjustment of the spectroscope, e.g., by tilting a Littrow mirror, the entire spectrum can be successively analyzed. A recorder coupled with the attenuator and the Littrow mirror then automatically records the absorption as a function of the wavelength on coordinate paper.

With this system, it has been found that, under certain conditions, weak absorption bands, which are due to traces of a chemical compound contained in the sample, can only be detected with difficulty in the plotted absorption spectrum. With prior art arrangements, electronic "ordinate extension appliances" have been provided to eliminate this disadvantage, and by means of these the deflection of the recorder can optionally be increased by a constant factor. However, the known "ordinate extension appliances" require a considerable technical expense.

The objects of the present invention are to obtain more sensitive indication and recording of weak variations in intensity, particularly of weak absorption bands, and to obtain such results with simpler apparatus than known to the prior art.

According to the invention, a second attenuator coupled with the first one is arranged for this purpose in the ray path of the beam of radiation used for measurement, the characteristic of the second attenuator being different from the characteristic of the first attenuator.

With this arrangement, one of the attenuators is introduced into the nulling beam of radiation for the purpose of nulling an absorption of the measuring beam. A second attenuator is then simultaneously introduced into the measuring beam of radiation thereby effecting additionally an attenuation of the latter beam of radiation. Thus, the first attenuator must be adjusted by a greater amount before a condition of equilibrium is reached. If the transmission factor of the sample is designated $D_P$, the transmission factor of the measuring beam attenuator is designated $D_M$, and the transmission factor of the nulling beam attenuator is designated $D_V$, the state of balance must satisfy the equation $$D_P \times D_M = D_V$$

The attenuators advantageously consist of diaphragms, preferably of comb type diaphragms, and it has been found advantageous if the attenuators have linear characteristics. A non-linear extension of the ordinate is then obtained. With an apparatus of the kind referred to above, the strong absorption bands are only slightly extended, and thus, the overall picture of the recorded absorption spectrum is substantially maintained, while a strong extension of the weak bands takes place, so that these can be clearly detected. Contrary to this, a linear ordinate extension would have the result of providing sensitive recording of the weak bands but the strong bands would become so deep that they could no longer be recorded.

In addition, there is the advantage that a linear recording can be immediately obtained if an ordinate extension is unnecessary. The attenuator is arranged in the ray path of the measuring beam of radiation in such a way that it can be removed from the ray path by tilting. The attenuator arranged in the nulling beam need not be changed or readjusted.

A spectroscope incorporating a prism and a tilting Littrow mirror through which an absorption spectrum is recorded by means of a recording instrument is more fully described in the following detailed description as an embodiment of the invention. It is understood, however, that the invention can, of course, also be applied with other radiation analysis systems for instance with non-dispersive gas analyzers.

Figure 1:
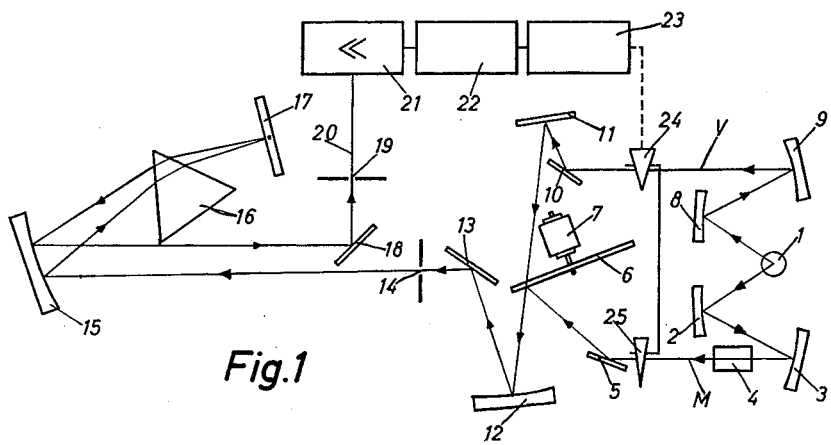
FIG. 1 is a schematic representation of the spectroscope.

Referring to the drawings, a source of radiation is designated by numeral 1 from which two beams of radiation M and V are emitted. The beam of radiation M (measuring beam) is passed via mirrors 2, 3 through a sample 4 and is then guided via a mirror 5 to hit a rotating chopper disk 6 which is driven by a motor 7. The chopper disk extends, in well known manner, over an angular range of 180 degrees and is coated with a reflecting layer on its lower side. The reference beam of radiation V is guided via mirrors 8, 9, 10 and 11, to the chopper disk. During half of its rotation, the chopper disk 6 permits the reference beam of radiation to pass through and to hit a concave mirror 12. The measuring beam M is reflected during the other half rotation of disk 6 to hit the mirror 12.

The beams of radiation M and V then reach alternately, via a mirror 13 the entrance slit 14 of a spectroscope.

The light passing through the slit 14 is then collinated by concave mirror 15 and guided by a dispersion prism 16 to impinge upon a Littrow mirror 17. The mirror 17 can be tilted about an axis that is parallel to the refracting edge of the prism 16 (not represented in detail in the drawings). The light passes again through the prism 16, and the mirror 15 produces, via a deviating mirror 18, a spectrum in front of the exit slit 19. A narrow wave length range is selected from this spectrum by means of the slit 19. This radiation impinges upon a thermocouple 20.

The voltage generated by the thermocouple 20 is fed, through an amplifier 21, to a demodulator, e.g., a ring modulator which—in a manner not represented in the drawings—is controlled by an auxiliary voltage synchronous with the motor 7. The output voltage of the demodulator 22 governs a control device 23. This control device actuates in well known manner an attenuator appliance 24, which is schematically represented as a triangle. A second attenuator 25 affecting the path of the measuring beam of radiation is coupled with the first mentioned attenuator.

Figure 2:
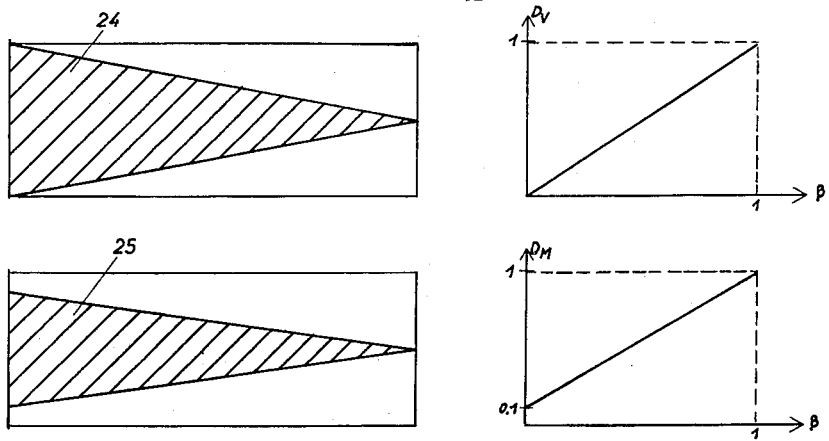
FIG. 2 shows in schematic representation the attenuators arranged in the ray path of the measuring beam and the nulling beam, respectively, and also the characteristics thereof.

The attenuators 24, 25 consist of thin inserts which are schematically represented in FIG. 2, and which may be of the comb type.

The beam of radiation M is attenuated by absorption in the sample 4. Consequently, intensities varying in accordance with the frequency of revolution of the chopper disk 6 become effective on the thermocouple 20. This has the effect that the control device 23 is put into operation which adjusts the attenuator 24 in known manner and thereby effects attenuation of the beam of radiation V. However, simultaneously with the adjustment of attenuator 24 the attenuator 25 is adjusted so as to attenuate the beam of radiation M. In order to make the intensities of the two beams of radiation equal, it is necessary to adjust the attenuator 24 further than would be required without the attenuator 25.

The attenuator 24 is coupled with a recording instrument (not represented in the drawings) which records the path of adjustment of the attenuator on coordinate paper. The Littrow mirror 17 is tilted in conformity with the advance of the recording instrument thereby analyzing and recording successively the entire spectrum. The attenuator 25 has the effect that the path of adjustment of the attenuator 24 and thus the travel of the recording instrument is considerably enlarged if the sample has a great transmission factor. The attenuator 25 can be tilted out of the ray path if such an ordinate extension is not desirable. The transmission factors $D_V$ and $D_M$ are represented in FIG. 2 as a function of the adjustment distance $s$.

$$D_V = s$$
$$D_M = a + bs$$

In the example represented: $a = 0.1$; $b = 0.9$. Consequently:

$$D_P \times D_M = D_P(a + bs) = D_V = s$$

In the case of balance, the following equation is satisfied:

$$s = \frac{a \times D_P}{1 - bD_P}$$

Without the attenuator 25, the path of adjustment of the attenuator 24 would satisfy the equation:

$$s' = D_P$$

The ordinate extension is:

$$\alpha = \frac{1-s}{1-s'} = \frac{1 - D_P(a+b)}{1 - D_P(1 - bD_P + b)}$$

Figure 3:
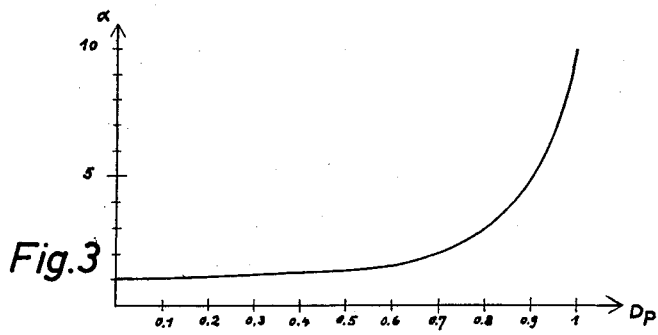
FIG. 3 shows the ordinate extension as a function of the transmission factor of the sample.

The result of the above equation will be seen by reference to FIG. 3 wherein the ordinate extension $\alpha$ is plotted as a function of the transmission factor of the sample $D_P$. It will be readily seen that with a sample having a low transmission factor, i.e., within the range of strong absorption bands, the factor $\alpha$ practically equals one, thus, no ordinate extension occurs. Within the small absorption range, however, an ordinate extension up to the factor 10 is obtained. Consequently, the spectrum is recorded in the desired manner, substantially unchanged. Only the weak absorption bands appear more visible.

I claim:

1. A null type radiation analysis system having a reference beam and a measuring beam; a reference beam attenuator insertable into said reference beam to achieve a desired relationship between said reference and measuring beams wherein the adjustment distance of the attenuator provides a measure of said relationship; a measuring beam attenuator having transmission characteristics differing from the reference beam attenuator; and means for selectively simultaneously moving said reference and measuring beam attenuators to change the attenuation of both of said beams in the same direction of attenuation, but at differing rates, to thereby achieve a null balance.

2. The apparatus of claim 1 wherein each of said attenuators is characterized by a linear relationship of transmission with adjustment distance.

3. The apparatus of claim 2 wherein said attenuators comprise comb-type inserts.

4. In a radiation comparison system, the combination of a radiation source; a detector producing a signal in response to radiation falling thereon; means defining at least a reference beam and a sample beam of said radiation; chopper means connected to alternately and periodically interrupt said beams; means for passing the chopped beams along a common path to said detector; optical nulling means in said reference beam; optical attenuating means in said sample beam; and controlling means responsive to said detector signal and connected in coincidental actuating relationship to both of said nulling means and attenuating means to selectively simultaneously move said nulling means and attenuating means to change the attenuation of both of said beams in the same direction of attenuation, but at differing rates, to thereby achieve a null balance.

5. The apparatus of claim 4 wherein the means for passing said beams along a common path includes monochromator means.

6. The apparatus of claim 4 wherein the optical attenuating characteristics of said optical nulling means and said optical attenuating means are dissimilar.

7. The apparatus of claim 6 wherein said nulling means and attenuating means are actuated by equal amounts.

8. The apparatus of claim 7 wherein each of said nulling means and attenuating means comprises wedge means.

9. A radiation comparison system having at least a first radiation beam and a second radiation beam; detector means for measuring the relative intensities of said beams; first attenuator means in attenuating relationship with said first beam; second attenuator means in attenuating relationship with said second beam; and means for selectively simultaneously moving said first and second attenuator means to change the attenuation of both of said beams in the same direction of attenuation, but at differing rates, to thereby achieve a null balance.

References Cited in the file of this patent

UNITED STATES PATENTS

| | | |
|---|---|---|
| 2,085,205 | Warncke | June 29, 1937 |
| 2,439,373 | Stearns | Apr. 6, 1948 |
| 2,605,671 | Canada | Aug. 5, 1952 |
| 2,694,335 | Albright et al. | Nov. 16, 1954 |
| 2,900,866 | Coates et al. | Aug. 25, 1959 |